(12) United States Patent
Letocart et al.

(10) Patent No.: US 10,895,795 B2
(45) Date of Patent: Jan. 19, 2021

(54) ELECTRICALLY SWITCHABLE GLAZING INCLUDING SURFACE ELECTRODES WITH ANISOTROPIC CONDUCTIVITY

(71) Applicant: SAINT-GOBAIN GLASS FRANCE, Courbevoie (FR)

(72) Inventors: Philippe Letocart, Raeren (BE); Magnus Kolter, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 277 days.

(21) Appl. No.: 15/739,970

(22) PCT Filed: Dec. 15, 2016

(86) PCT No.: PCT/EP2016/081100
§ 371 (c)(1),
(2) Date: Mar. 29, 2018

(87) PCT Pub. No.: WO2017/102900
PCT Pub. Date: Jun. 22, 2017

(65) Prior Publication Data
US 2019/0033677 A1    Jan. 31, 2019

(30) Foreign Application Priority Data
Dec. 16, 2015  (EP) ..................... 15200429

(51) Int. Cl.
*G02F 1/155*    (2006.01)
*B32B 17/10*    (2006.01)
(Continued)

(52) U.S. Cl.
CPC ........ *G02F 1/155* (2013.01); *B32B 17/10036* (2013.01); *B32B 17/10174* (2013.01);
(Continued)

(58) Field of Classification Search
CPC . G02F 1/155; G02F 1/15; G02F 1/153; G02F 1/1525; G02F 2001/164;
(Continued)

(56) References Cited

U.S. PATENT DOCUMENTS

2003/0227663 A1    12/2003  Agrawal et al.
2008/0006525 A1*   1/2008   Fanton ................... B32B 17/10
                                                      204/192.17
(Continued)

FOREIGN PATENT DOCUMENTS

CN    101738810 A    6/2010
DE    112012006778 T5    5/2015
(Continued)

OTHER PUBLICATIONS

International Search Report for International Application No. PCT/EP2016/081100 filed Dec. 15, 2016 on behalf of Saint-Gobain Glass France, dated Feb. 22, 2017. 7 pages. (German + English Translation).

(Continued)

*Primary Examiner* — William R Alexander
*Assistant Examiner* — Sharrief I Broome
(74) *Attorney, Agent, or Firm* — Pillsbury Winthrop Shaw Pittman LLP (57) ABSTRACT

A glazing having electrically switchable properties is presented. The glazing includes, areally arranged in sequence, a substrate, a first electrically conductive layer, an active layer, and a second electrically conductive layer. According to one aspect, at least one electrically insulating barrier layer is areally arranged within, and completely covered areally by, one of the first and second electrically conductive layers. According to another aspect, the active layer is an electrochromic functional element, that includes an electrochromic layer adjacent the first electrically conductive layer, and a (Continued)

counter electrode adjacent the second electrically conductive layer.

28 Claims, 4 Drawing Sheets

(51) Int. Cl.
- *G02F 1/1523* (2019.01)
- *G02F 1/153* (2006.01)
- *G02F 1/1343* (2006.01)

(52) U.S. Cl.
CPC ...... *B32B 17/10495* (2013.01); *G02F 1/1525* (2013.01); *G02F 1/1533* (2013.01); *G02F 1/13439* (2013.01); *G02F 2001/1536* (2013.01)

(58) Field of Classification Search
CPC .. G02F 1/15165; G02F 1/1523; G02F 1/1533; G02F 2001/1536; G02F 2001/15145; G02F 1/163; G02F 1/1503; G02F 1/157; G02F 1/161; G02F 1/1506; G02F 2001/1502; G02F 2001/1552; G02F 2202/36; G02F 1/1508; G02F 2203/02; C09K 9/02; C09K 2211/1029; C09K 2211/10111; C09K 9/00; C09K 2211/1007; C09K 2211/1014; C09K 2211/1033; C09K 2211/1048; C09K 2211/1051; C09K 2211/1055; C09K 2211/1059; C09K 2211/1408; H01M 10/052; H01M 10/0565; H01M 10/0525; H01M 6/166; H01M 6/168; H01M 6/181; H01M 6/22; H01M 10/562; H01M 10/0566; H01M 10/0568; H01M 10/0569; H01M 10/36; H01M 12/06; H01M 12/08; H01M 2300/0022; H01M 2300/0082; H01M 2300/0091; H01M 4/13; H01M 4/505; H01M 4/525; G02B 2027/0114; G02B 26/004; G02B 27/01; G02B 1/11; G02B 1/113; G02B 1/116; G02B 2027/0112; G02B 2027/012; G02B 30/00; G02B 30/27; G02B 3/00; G02B 5/02; G02B 5/0242; G02B 5/0247; G02B 5/08; G02B 6/2746

See application file for complete search history.

(56) References Cited

U.S. PATENT DOCUMENTS

| | | | | |
|---|---|---|---|---|
| 2008/0144162 | A1* | 6/2008 | Duroux | C03C 17/3411 359/270 |
| 2012/0026573 | A1 | 2/2012 | Collins et al. | |
| 2012/0062975 | A1* | 3/2012 | Mehtani | G02F 1/163 359/265 |
| 2012/0182592 | A1 | 7/2012 | Ferreira et al. | |
| 2012/0182593 | A1* | 7/2012 | Collins | B32B 17/10183 359/275 |
| 2012/0200908 | A1* | 8/2012 | Bergh | G02F 1/13439 359/275 |
| 2013/0271812 | A1* | 10/2013 | Brown | G01J 1/4228 359/275 |
| 2013/0286460 | A1* | 10/2013 | Moriyama | G02F 1/155 359/267 |
| 2014/0022621 | A1* | 1/2014 | Kailasam | H01J 37/3476 359/269 |
| 2014/0329006 | A1 | 11/2014 | Bhatnager et al. | |
| 2016/0168396 | A1 | 6/2016 | Letocart et al. | |

FOREIGN PATENT DOCUMENTS

| | | |
|---|---|---|
| EP | 1862849 A1 | 12/2007 |
| EP | 2660652 A1 | 11/2013 |
| JP | S56-117274 A | 9/1891 |
| JP | S58-137881 A | 8/1983 |
| JP | S61-155822 U | 9/1986 |
| JP | H0255341 A | 2/1990 |
| JP | 2008-040422 A | 2/2008 |
| JP | 2012-150451 A | 8/2012 |
| JP | 2013-501967 A | 1/2013 |
| WO | WO 2010/032070 A1 | 3/2010 |
| WO | 2010/147494 A1 | 12/2010 |
| WO | 212/007334 A1 | 1/2012 |
| WO | 2015/032535 A1 | 3/2015 |
| WO | 2016/126460 A2 | 8/2016 |
| WO | 2016/154064 A1 | 9/2016 |

OTHER PUBLICATIONS

Written Opinion for International Application No. PCT/EP2016/081100 filed Dec. 15, 2016 on behalf of Saint-Gobain Glass France, dated Feb. 22, 2017. 17 pages. (English Translation + German Original).

* cited by examiner

ELECTRICALLY SWITCHABLE GLAZING INCLUDING SURFACE ELECTRODES WITH ANISOTROPIC CONDUCTIVITY

CROSS REFERENCE TO RELATED APPLICATIONS

The present application is the U.S. National Stage of International Patent Application No. PCT/EP2016/081100 filed on Dec. 15, 2016 which, in turn, claims priority to European Patent Application No. 15200429.7 filed on Dec. 16, 2015.

The invention relates to an electrically switchable glazing with surface electrodes with anisotropic conductivity, a method for production thereof, and use thereof.

Glazings with switchable or controllable optical properties are a type of modern, active glazings. In such glazings, the transmittance of light can, for example, be actively influenced as a function of an applied electrical voltage. The user can, for example, switch from a transparent to a nontransparent state of the glazing to prevent seeing into a space from the outside. In other glazings, the transmittance can be controlled continuously, for example, to regulate the entry of solar energy in a space. Thus, undesirable heating of buildings or of vehicle interiors is avoided and energy consumption or $CO_2$ emission caused by air conditioners is reduced. Consequently, active glazings serve not only for the visually appealing design of façades and a pleasant lighting design in interiors, but are also advantageous in terms of energy and ecology.

The known switchable or controllable glazings are based on different technical principles. Electrochromic glazings are known, for example, from US 20120026573 A1 and WO 2012007334 A1.

The invention is particularly directed at electrochromic glazings but not limited thereto. Electrochromic glazings include at least one electrochemically active layer, which is capable of reversibly storing charges. The oxidation states in the stored and released state differ in their coloring, with one of these states being transparent. The storing reaction is controllable via the potential difference applied from the outside. The basic structure of the electrochromic glazing thus includes at least one electrochromic material, such as tungsten oxide, which is in contact both with a surface electrode and with a charging source, such as an ion conductive electrolyte. Moreover, the electrochromic layer structure contains a counter electrode, which is likewise capable of reversibly storing cations, and is in contact with the ion conductive electrolyte, as well as another surface electrode, which connects to the counter electrode. The surface electrodes are connected to an external voltage source, by means of which the voltage applied to the active layer can be regulated. The surface electrodes are in most cases thin layers of electrically conductive material, frequently indium tin oxide (ITO). Frequently, at least one of the surface electrodes is applied directly on the surface of one of the individual panes of the composite glass, for example, by cathodic sputtering (sputtering).

Sputtering processes require extreme care with regard to the purity of the surfaces to be coated and must be carried out in a vacuum. Even the smallest impurities or individual grains of dust within the layer sequence can result in visible defects in the product. Conductive particles in the layer stack result, for example, in a short circuit of the two transparent electrically conductive layers. The same effect is also caused by a particle on the glass substrate, which results in a local delamination due to the stresses introduced by the particle itself. Depending on the location of the delaminated region in the layer stack, a short circuit must also be anticipated in this case. The spatial extent of the visible imperfection caused by the short circuit extends far beyond the actual defect, since a voltage drop occurs in the vicinity of the defect. This region of the voltage drop is visible to the observer as a region of the electrochromic glazing deviating in color from the surroundings.

One method for the repair of imperfections is the isolation of the imperfection causing the short circuit by means of a laser cutting process as disclosed, for example, in WO 2015032535 A1. There, the defect is separated from the rest of the layer structure by an isolating separation line, by which means the defect-related voltage drop can no longer affect the surrounding coating. The remaining defect is usually so small that it no longer has a disturbing effect on the observer. This laser process is complicated and expensive and thus only suitable for reducing the rejection rate of the coating process to a limited extent.

US 2014/0022621 A1 discloses an electrochromic device with an electrically insulating barrier layer that is provided between an electrically conductive layer and an active layer. If a foreign particle is present in the coating process, the coating is at least partially deposited on this particle instead of the substrate. This particle subsequently causes a local delamination and can result in a short circuit. The barrier layer between an electrically conductive layer and an active layer prevents such a short circuit, according to US 2014/0022621 A1. This is, however, the case only if the delamination occurs such that the barrier layer between the two electrically conductive layers remains unchanged and is itself not part of the delaminated region. A barrier layer that is provided in the immediate vicinity of the active layer must also have adequately high electrochemical stability such that it is affected as little as possible by the redox process occurring in the active layer. The materials available for the barrier layer in accordance with US 2014/0022621 A1 are thus limited. Moreover, the contact resistance between the barrier layer and the active layer is undesirably high.

In light of this background, it is desirable to improve the tolerance of electrically switchable glazings relative to local defects, but without having to accept the disadvantages mentioned.

The object of the invention is to provide an electrically switchable glazing that has higher tolerance relative to local defects as well as a method for production thereof.

The object of the present invention is accomplished according to the invention by an electrically switchable glazing, a method for production thereof, and use thereof in accordance with this disclosure. Preferred embodiments are also disclosed.

The invention comprises a glazing with electrically switchable properties, wherein at least a first substrate, a first electrically conductive layer, an active layer, and a second electrically conductive layer are areally arranged in this sequence relative to one another. At least one of the electrically conductive layers, in other words, the first electrically conductive layer and/or the second electrically conductive layer, contains one or a plurality of barrier layers, referred to in the following as "electrically insulating" barrier layers. In the context of the invention, the electrically insulating barrier layers are arranged within the electrically conductive layer, in other words, the two surfaces of the barrier layer running parallel to the substrate are completely covered areally by the material of the electrically conductive layer. For example, the first electrically conductive layer has at least one barrier layer that is arranged areally within the first electrically conductive layer, with the electrically insulating barrier layer being completely covered areally by the first electrically conductive layer. Alternatively, or in addition to the first electrically conductive layer, the second electrically conductive layer has at least one barrier layer that is arranged areally within the second electrically conductive layer, with the electrically insulating barrier layer being completely covered areally by the second electrically conductive layer.

The switchable glazing according to the invention has, through the use of a barrier layer, high tolerance relative to local defects, since this barrier layer separates the first conductive layer and the second conductive layer from one another even after delamination. Thus, the voltage drop in the vicinity of the defect is minimized, since the conductivity perpendicular to the layer stack is greatly reduced by the barrier layers. When, after delamination, a portion of an electrically conductive layer remains above the barrier layer (i.e., between the barrier layer and the active layer in the original layer stack), the layer thickness of the remaining portion is smaller than the total layer thickness of the conductive layer without the use of barrier layers. The sheet resistance of this remaining thinner portion of the electrically conductive layer is thus substantially higher, since the sheet resistance increases in inverse proportion to layer thickness. The higher resistance is accompanied by a lower short circuit current between the first electrically conductive layer and the second electrically conductive layer, by which means the effects of delamination on product quality are reduced according to the invention. The arrangement according to the invention of the barrier layer within an electrically conductive layer is thus particularly advantageous due to the division of the conductive layer into multiple layer sections. If the delamination occurs such that no barrier remains, the current strength is limited by the low thickness of the remaining electrically conductive layer and the associated low lateral conductivity of the electrode. The location of the delamination remains visible in the product, but is, however, visually inconspicuous since a short circuit and the associated large-area visible voltage drop are completely avoided or at least significantly reduced.

In a preferred embodiment, a layer portion of the electrically conductive layers is in direct contact with the active layer. Since the active layer is provided in the immediate vicinity of an electrically conductive layer, reduced contact resistance occurs between the surface electrode (consisting of barrier layers and conductive layers) and the active layer. Also, there is greater flexibility in terms of the selection of the material of the electrically insulating barrier layers, since they are not in direct contact with the active layer and thus do not need to have the electrochemical stability required for that. Outside the defect site, the contact resistance of the electrically switchable glazing is not inhibited by the use of the barrier layer since the active layer is in direct contact with an electrically conductive layer having good conductivity and thus sufficient electron transfer from the conductive layer to the active layer is ensured. The defect related short circuit is larger, the higher the conductivity of the layers involved. On the other hand, a certain minimum conductivity of the surface electrodes in the vicinity of the active layer is necessary since, otherwise, the functionality of the glazing is limited. A limitation of the functionality is, for example, evidenced by a reduction in the switching speed or even a deterioration in the homogeneity in the switched state. This conductivity in the vicinity of the active layer can be improved when the active layer and the first electrically conductive layer and/or the second electrically conductive layer are in direct contact with one another.

In an alternative embodiment of the invention, at least one barrier layer is arranged within the first and/or second electrically conductive layer and another barrier layer is provided between the electrically conductive layer and the active layer, directly adjacent the active layer. This embodiment has, moreover, improved behavior in the event of delamination since at least one of the conductive layers is divided by the barrier layer into a plurality of layer portions.

The first electrically conductive layer and the electrically insulating barrier layers situated therein function as the first surface electrode of the electrically switchable glazing, whereas the second electrically conductive layer and the barrier layers introduced within it are used as the second surface electrode. The first surface electrode and the second surface electrode are preferably transparent. This has the advantage that the glazing is transparent to daylight, if need be, without the color of the light being affected.

The electrically conductive layer permeated by one or a plurality of barrier layers presents, in terms of its electrical conductivity, anisotropy, with the horizontal conductivity substantially higher than the perpendicular conductivity. In this context, "horizontal conductivity" is defined as the conductivity of the first electrically conductive layer and the second electrically conductive layer parallel to the respective layer, whereas "perpendicular conductivity" corresponds to the conductivity perpendicular to the layer stack. In this case, the entire layer structure of the electrically conductive layer including the barrier layer is considered. The horizontal conductivity is, in the context of the invention, as high as possible in order to achieve good electrical contacting of the active layer, whereas the perpendicular conductivity should be exactly as high as is necessary for unlimited functionality of the electrically switchable pane. The high defect tolerance according to the invention is achieved by precisely this reduction in the vertical conductivity.

In the context of the invention, one or a plurality of electrically insulating barrier layers are introduced within one of the electrically conductive layers. These barrier layers and the respective surrounding electrically conductive layer form in each case a surface electrode of the switchable glazing. A single barrier layer within one of the electrically conductive layers already suffices to achieve an improvement according to the invention of the defect tolerance of the electrically switchable glazing. A further improvement can be achieved by introducing at least one barrier layer into each of the two electrically conductive layers.

A structure with one or a plurality of barrier layers in only one electrically conductive layer, wherein the other electrically conductive layer contains no barrier layers at all is not only advantageous in terms of lower production costs, but also in terms of improvement of the adhesion of the layers and reduction of the stresses developing within the layer stack. Thus, for example, tempering of the corresponding electrically conductive layer is not absolutely necessary when it includes no barrier layers.

Since asymmetric development of defects is frequently observed, it has proved reasonable in practice to equip at least the second electrically conductive layer with at least one barrier layer. Here, the layer stack is deposited on the first substrate in the following order: first electrically conductive layer, active layer, and second electrically conductive layer. The second electrically conductive layer is, accordingly, the one of the electrically conductive layers that is farthest from the first substrate. If delamination occurs after deposition of the first electrically conductive layer without barrier layers or after deposition of the active layer on this first electrically conductive layer, the resultant short circuit can be reduced by barrier layers in the second electrically conductive layer. Delamination during the deposition of the first electrically conductive layer or of the active layer is one of the more frequently occurring effects. In this case, the delaminated particle is highly likely completely detached before deposition of the second electrically conductive layer. What percentage of the first electrically conductive layer is split off depends on the respective defect structure. The second electrically conductive layer is thus deposited on the delaminated region, by which means a short circuit is created between the remaining portion of the first electrically conductive layer and the second electrically conductive layer. If, for reasons of cost and for simplification of the method, barrier layers are to be introduced only within one of the electrically conductive, it is, accordingly, advantageous to introduce the barrier layers into the second electrically conductive layer since the second electrically conductive layer is most likely not delaminated.

If a first layer is areally arranged above a second layer, this means, in the context of the invention, that the first layer is arranged farther from the nearest substrate than the second layer. If a first layer is arranged below a second layer, this means, in the context of the invention, that the second layer is arranged farther from the nearest substrate than the first layer.

In the context of the invention, a layer can be made of one material. However, a layer can also comprise two or more individual layers of different materials.

In an advantageous embodiment of the invention, the first electrically conductive layer and/or the second electrically conductive layer is homogeneous, i.e., it is made of one and the same material. The at least one barrier layer accordingly divides the electrically conductive layer into two layer sections made of the same material, wherein it is preferable for both layer sections to be directly adjacent the barrier layer (direct contact). In the case of a plurality of barrier layers, this also applies, wherein the electrically conductive layer is divided here into a plurality of layer sections made of the same material, wherein it is preferable for two layer sections made of the same material to be directly adjacent a respective barrier layer.

In another embodiment of the invention, the first electrically conductive layer, the active layer, the second electrically conductive layer, and the at least one barrier layer have the same areal extension, i.e., they end flush at the layer edges.

If a first layer is arranged above or below a second layer, this does not necessarily mean, in the context of the invention, that the first and the second layer are situated in direct contact with one another. One or a plurality of additional layers can be arranged between the first and the second layer so long as this is not explicitly precluded. If a first and a second layer are immediately adjacent, no additional layers are situated between the first and the second layer and they are in direct contact areally.

If a first layer is provided within a second layer, the first layer is surrounded by the second layer such that the surface of the first layer is completely covered by the second layer. In the context of the invention, this means that the electrically insulating barrier layers that are arranged within the electrically conductive layer are completely covered areally by the surrounding electrically conductive layer. Accordingly, within the surface electrodes, there is an alternating layer sequence of layer sections of electrically conductive layer and electrically insulating barrier layer, with the outer layers always formed by the electrically conductive layer. This definition is based exclusively on the areal arrangement of the layers. At the edges of the substrate or at the boundary with an uncoated region, the barrier layer is preferably exposed and is not surrounded by the electrically conductive layer.

Optionally, in addition to the barrier layers arranged within the conductive layers, other barrier layers, which are not situated within the electrically conductive layers, can be included in the layer stack.

The layer stack comprising the first electrically conductive layer, the active layer, and the second electrically conductive layer preferably extends over the entire surface of the substrates; alternatively, however, over only a part of the surface of the substrates.

The electrically conductive layers can be applied directly on the surface of the substrates. Alternatively, the electrically conductive layers and the active layer can be applied on a carrier film or a carrier glass that is adhesively bonded to the substrates.

In a preferred embodiment of the glazing according to the invention, the electrically insulating barrier layer passes through the first electrically conductive layer and/or the second electrically conductive layer such that a layer portion of at least 1% of the total thickness, preferably at least 5% of the total thickness of the respective electrically conductive layer is arranged between the electrically insulating barrier layer and the active layer. The electrically conductive layers are thus divided by the barrier layer(s) into a plurality of individual layers, with an alternating sequence of conductive layers and barrier layers present and the conductive layers ending the layer stack. If a portion of the electrically conductive layer of at least 1% lies above the barrier layer (between the barrier layer and the active layer), the conductivity in the immediate vicinity of the active layer is improved, by which means reduced contact resistance is present at the layer transition. A further improvement is noted in the case of layer portions of at least 5% of the electrically conductive layer above the uppermost barrier layer. Here, a layer portion of 1% of the total thickness of the electrically conductive layer above the barrier layer that on a substrate, an electrically conductive layer with a thickness of 99% of the total thickness of all electrically conductive layers is present on this substrate, followed by an electrically insulating barrier layer, on which another electrically conductive layer with a thickness of 1% based on the total thickness of the electrically conductive layers is provided on this substrate. The total thickness of the electrically conductive layer on a substrate equals the sum of the thickness of all individual electrically conductive layers on the substrate, separated from one another by barrier layers. The layer stack of electrically conductive layers following the first substrate, which are optionally separated by barrier layers, yields the first electrically conductive layer. The first electrically conductive layer, together with the barrier layers possibly present therein, constitutes, in its totality, the first surface electrode. The active layer is deposited on the first electrically conductive layer, and the second electrically conductive layer is situated thereon. The second electrically conductive layer optionally also includes barrier layers, which separate the individual layer fragments of the second electrically conductive layer from one another. These barrier layers and the layer sections of the second electrically conductive layer yield, in its totality, the second surface electrode.

The first electrically conductive layer and/or the second electrically conductive layer contain, in a possible embodiment, in each case, 1 to 20, preferably 2 to 15, particularly preferably 2 to 6 electrically insulating barrier layers. The higher the number of barrier layers, the higher the defect tolerance of the electrically switchable glazing. In order to avoid a short circuit, even after development of the defect, an electrically insulating barrier layer must be obtained between the first electrically conductive layer and the second electrically conductive layer. However, in practice, it is not reliably predictable which portion of the layer stack is damaged since various mechanisms result in the development of defects and the geometry of the resulting delaminated region cannot be fully predicted. With an increasing number of barrier layers within an electrically conductive layer, the likelihood increases that at least one barrier layer will remain after delamination. After delamination, two different defect scenarios are conceivable. On the one hand, the delamination can occur all the way to a barrier layer, which is then located between the remaining portion of the first conductive layer and the second conductive layer, in which case only a very small defect-induced short circuit current flows. The size of this remaining defect-induced short circuit current is largely determined by the conductivity of the barrier layer. On the other hand, a layer portion of the first electrically conductive layer can remain above the barrier layer, by means of which a short circuit develops between this layer portion of the first electrically conductive layer and the second electrically conductive layer. By means of the invention, at least one of the electrically conductive layers is, however, divided into a plurality of (at least two) individual layers whose sheet resistance increases with decreasing layer thickness and which are separated by barrier layers. The thinner the electrically conductive layer remaining above the barrier layer (between the barrier layer and the other electrically conductive layer of opposite polarity), the higher its sheet resistance and the smaller the short circuit current created. By means of this reduction in the short circuit current according to the invention, the defect of the electrically switchable glazing optically visible for the observer is also minimized. With an increasing number of barrier layers per electrically conductive layer, the layer thickness of the individual layer sections drops, while the total thickness of the electrically conductive layer remains constant. It is thus possible to ensure that after delamination, the least possible layer portion or no layer portion of a conductive layer remains above the uppermost barrier layer. The use of multiple barrier layers per electrically conductive layer thus further improves the defect tolerance of the glazing having an active layer. However, production costs also increase with the number of barrier layers to be applied during the production process. A particularly good relationship between cost-effective producability of the product and defect tolerance of the electrically switchable glazing is obtained with 2 to 6 electrically insulating barrier layers within at least one of the electrically conducting layers.

In a preferred embodiment, the layer portion of the the first electrically conductive layer and/or the second electrically conductive layer adjoining the active layer is less than or equal to 50% based on the total thickness of the respective electrically conductive layers. Thus, at least half of the electrically conductive layer is positioned below the barrier layer and is protected by the barrier layer with regard to a possible short circuit. Halving the thickness of the individual electrically conductive layers by the barrier layer results in doubling the sheet resistance compared to an electrically conductive layer having the same total thickness without a barrier layer. The portion of the electrically conductive layer positioned above the barrier layer should not exceed 50% since if delamination occurs, this upper portion of the electrically conductive layer is most likely affected. If a short circuit happens, the short circuit current occurring must be kept as little as possible, i.e., the sheet resistance of the electrically conductive layer affected should be as high as possible. This is achieved through the division according to the invention of the electrically conductive layer into a portion less than or equal to 50% situated above the barrier layer and a portion greater than or equal to 50% situated below the barrier layer.

In a particularly preferred embodiment of the invention, the first electrically conductive layer and/or the second electrically conductive layer contain at least two electrically insulating barrier layers. Thus, improved defect tolerance is achieved since even when one of the barrier layers is removed during the lamination, another barrier layer is present; and, furthermore, the electrically conductive layer is divided into thinner individual layers having higher sheet resistance. This is particularly advantageous in order to minimize the current resulting from a short of two electrically conductive layers as much as possible regardless of the layer depth to which the delamination of a particle occurs.

Preferably, the first electrically conductive layer and/or the second electrically conductive layer contain at least two electrically insulating barrier layers, wherein the layer portion of the electrically conductive individual layers relative to the total thickness of an electrically conductive layer decreases from the nearest substrate in the direction of the active layer. If no second substrate follows the second electrically conductive layer, the observation is in this case nevertheless made starting from this side in the direction of the active layer. Accordingly, the greatest percentage of the electrically conductive layer is positioned in the immediate vicinity of the substrate, followed by a barrier layer, another layer portion of the electrically conductive layer, and at least one further barrier layer and one further layer portion of the electrically conductive layer. The likelihood that a certain layer portion is exposed after the lamination of a particle increases depending on the location of the layer relative to the substrate in the direction of the active layer. The closer a layer section is to the active layer, the more likely the layers positioned above it will be lost in the event of delamination and the exposed portion of the electrically conductive layer will be involved in a short circuit. Thus, it is advantageous to reduce the thickness of the electrically conductive individual layers from the substrate in the direction of the active layer and thus to increase the sheet resistance of the individual layers in the same direction.

In an advantageous embodiment according to the invention, the first electrically conductive layer and the second electrically conductive layer contain, in each case, two electrically insulating barrier layers, wherein the layer structure is as follows:
first substrate,
first electrically conductive layer with two barrier layers, wherein a layer portion of at least 50%, based on the total layer thickness of the first electrically conductive layer, is arranged in the immediate vicinity of the first substrate, and there follows a barrier layer, another section of the first electrically conductive layer, another barrier layer, and, finally, a section of the first electrically conductive layer with a layer thickness of 5% to 25%, preferably of 10% to 20%,
active layer, second electrically conductive layer with two barrier layers, wherein a section of the second electrically conductive layer with a layer thickness of 5% to 25%, preferably of 10% to 20%, is in the immediate vicinity of the active layer, and there follows a barrier layer, another section of the second electrically conductive layer, another barrier layer, and, finally, a section of the second electrically conductive layer with a layer thickness of at least 50%, based on the total layer thickness of the second electrically conductive layer.

Such an arrangement has proved to be particularly advantageous since it has both high defect tolerance and sufficient conductivity in the immediate vicinity of the electrically conductive layer. Optionally, a second substrate is applied on the second electrically conductive layer.

The electrically conductive layers are preferably transparent. The electrically conductive layers preferably contain at least a metal, a metal alloy, or a transparent conductive oxide (TCO). The electrically conductive layers particularly preferably contain silver, gold, copper, nickel, chromium, tungsten, graphite, molybdenum, and/or a transparent conductive oxide, preferably indium tin oxide (ITO), fluorine-doped tin oxide ($SnO_2$:F), antimony-doped tin oxide, aluminum-doped zinc oxide, boron-doped zinc oxide, or gallium-doped zinc oxide.

In a first preferred embodiment, a metal is selected as the material of the electrically conductive layers, with the first electrically conductive layer and/or the second electrically conductive layer having a total layer thickness in each case of 1 nm to 50 nm, preferably 2 nm to 30 nm, particularly preferably 3 nm to 15 nm. The thickness of the individual layer portions of the electrically conductive first layer and of the electrically conductive second layer separated by barrier layers yields in total in each case the total layer thickness. Thus, advantageous electrical contacting of the active layer and good horizontal conductivity of the layers are achieved.

In a second preferred embodiment, the electrically conductive layers include a transparent conductive oxide, with the first electrically conductive layer and the second electrically conductive layer having a total thickness of 20 nm to 2 μm, particularly preferably of 50 nm to 1 μm, most particularly preferably of 100 nm to 600 nm, and in particular of 300 nm to 500 nm. Thus, advantageous electrical contacting of the active layer and good horizontal conductivity of the layers are achieved.

The sections of the electrically conductive layers divided by barrier layers can also differ from one another in their composition. This is advantageous since in such an embodiment, only the material composition of the upper section of the electrically conductive layers, which directly contacts the active layer, has to be compatible with the material of the active layer. There is substantially greater flexibility of materials usable for the other layer sections of the electrically conductive layers. Thus, for example, the layer sections facing away from the active layer can be made from a less expensive material, whereas the sections of the electrically conductive layer adjacent the active layer are made from a higher quality material with correspondingly better properties. The material composition of the first electrically conductive layer and the second electrically conductive layer themselves can also differ from one another.

The electrically conductive layers with electrically insulating barrier layers are intended to be electrically connected to at least one external voltage source in a manner known per se in order to serve as surface electrodes of the glazing with electrically switchable properties. The electrical connection is done by suitable connection cables, for example, foil conductors, which are, optionally, connected to the electrically conductive layers via so-called busbars, for example, strips of an electrically conductive material, or electrically conductive imprints, to which the electrically conductive layers are connected. The mounting of the connection cables on the electrically conductive layers can be done, for example, by soldering, gluing, or insertion.

The electrically insulating barrier layers have substantially lower conductivity than the surrounding electrically conductive layers such that the vertical conductivity of the total layer structure consisting of a conductive layer and a barrier layer is reduced by introduction of the barrier layer. The electrically insulating barrier layers must, nevertheless, have a certain conductivity since electron transport to the active layer is needed for unrestricted functioning of the electrically switchable element. Thus, according to the invention, the term "electrically insulating barrier layers" means barrier layers that have low electrical conductivity, which is substantially less than that of the electrically conductive layers.

Materials of different conductivity can be used for the realization of suitable barrier layers, with the layer thickness of the barrier layer increasing with increasing conductivity of the material. The higher the effective vertical conductivity of the material, the thicker the barrier layer must be selected in order to obtain the desired electrically insulating effect of the barrier layer. Thus, suitable as materials for the electrically insulating barrier layers are, in particular, doped or non-doped metal oxides and/or nitrides, preferably tantalum oxide, titanium oxide, silicon oxide, zirconium oxide, hafnium oxide, yttrium oxide, aluminum oxide, aluminum nitride, silicon nitride, and/or mixtures thereof. Doped metal oxides or nitrides are, due to their relatively high conductivity, used in a higher layer thickness than non-doped metal oxides or nitrides.

Within a conductive layer, the barrier layers introduced into this conductive layer can differ from one another in their composition and layer thickness. In order to obtain particularly effective electrical insulation, one barrier layer made of silicon oxide and two barrier layers made of silicon nitride or two barrier layers made of silicon oxide and one barrier layer made of silicon nitride can be used. The barrier layers are preferably arranged such that an alternating sequence of the materials of the barrier layers is created.

In the case of use of non-doped metal oxides or nitrides, these are preferably used in a layer thickness of, in each case, at most 100 nm, preferably 2 nm to 50 nm, particularly preferably 5 nm to 30 nm. Here, the total thickness of all barrier layers introduced within an electrically conductive layer is 10 nm to 500 nm, preferably 20 nm to 300 nm. Accordingly, with non-doped metal oxides or nitrides, the deposition of comparatively thin layers is already sufficient for obtaining a good electrically insulating effect. Since, however, reproducible residual conductivity of the electrically insulating barrier layers is desired, controlled defects are introduced into the barrier layers during the deposition process. These increase the conductivity of the barrier layer such that the active layer is sufficiently connected electrically.

Alternatively, doped metal oxides or nitrides are used as barrier layers. These have higher conductivity and are deposited in a greater layer thickness than non-doped layers. In this case, the desired conductivity of the barrier layers is adjusted by means of the doping level. This is particularly advantageous since this parameter can be very easily controlled in the coating process. The electrically insulating barrier layers have, in this case, a thickness, in each case, of 10 nm to 1000 nm, preferably 50 nm to 500 nm, particularly preferably 100 nm to 300 nm, wherein the total thickness of all electrically insulating barrier layers introduced within an electrically conductive layer is 10 nm to 3000 nm, preferably 100 nm to 1000 nm. These ranges have proved suitable for ensuring sufficient residual conductivity vertical to the layer structure.

An example of a doped metal oxide very well suited as a barrier layer is gold-doped tantalum oxide.

The first surface electrode comprises the first electrically conductive layer and, optionally, at least one barrier layer, and the second surface electrode comprises the second electrically conductive layer and, optionally, at least one barrier layer. According to the invention, at least one barrier layer is present in the switchable glazing. The sheet resistance of the first surface electrode and the second surface electrode is in total preferably 0.01 $\Omega_\square$ to 100 $\Omega_\square$, particularly preferably 0.1 $\Omega_\square$ to 20 $\Omega_\square$, most particularly preferably 0.5 $\Omega_\square$ to 5 $\Omega_\square$. In this range, a sufficiently large current flow between the electrodes of the switchable glazing is ensured, enabling optimum functionality of the active layer. The value range indicated applies both for embodiments in which only the first surface electrode or the second surface electrode include one or a plurality of barrier layers and in cases in which both electrodes are equipped with barrier layers.

For the surface electrodes that include barrier layers, the electrical conductivity parallel to the layer stack (horizontal conductivity) is 100 to 1000 times greater than the conductivity lateral to the layer stack (vertical conductivity), yielding the anisotropic conductivity of the surface electrodes according to the invention.

The layer resistance of the electrically conductive layers results from the layer resistances of the individual layer sections of the respective electrically conductive layer. When an electrically conductive layer is, for example, divided by two barrier layers into three layer sections with the resistances $R_1$, $R_2$, and $R_3$, the resultant layer resistance of the electrically conductive layer is:

$$R_\square = \frac{1}{1/R_1 + 1/R_2 + 1/R_3}$$

Preferably, the product of the specific resistance and layer thickness for the individual electrically insulating barrier layers is, in each case, between $10^7$ $\Omega m \times nm$ and $10^{13}$ $\Omega m \times nm$, particularly preferably between $10^8$ $\Omega m \times nm$ and $10^{12}$ $\Omega m \times nm$, in particular between $10^9$ $\Omega m \times nm$ and $10^{11}$ $\Omega m \times nm$. The person skilled in the art can calculate from this the required layer thickness for a material desired as a barrier layer or also determine, with a given layer thickness, what specific resistance the material used should have.

The actual switchable functional element of the glazing according to the invention can, in principle, be any functional element with electrically switchable optical properties known to the person skilled in the art. The configuration of the active layer is governed by the nature of the functional element.

The active layer of the glazing according to the invention can be any functional element known to the person skilled in the art. The invention targets, in particular, large-area switchable elements, wherein pixel-based display media are specifically precluded. The switchable area of the glazing is preferably at least 1 mm². Preferably, the active layer is a functional element operated with direct current, particularly preferably an electrochromic functional element. The configurations of barrier layers mentioned are particularly suitable in combination with functional elements operated using direct current. Use in combination with alternating-current-based technology, such as SPD (suspended particle device) and PDLC (polymer dispersed liquid crystal) is, however, conceivable. A corresponding adaptation of the barrier layers is possible for the person skilled in the art by means of simple experiments.

In a particularly advantageous embodiment of the invention, the glazing contains an electrochromic functional element. Here, the active layer preferably comprises an electrochromic layer that is arranged adjacent the first electrically conductive layer, an electrolyte adjacent the electrochromic layer, and a counter electrode adjacent the electrolyte and the second electrically conductive layer. The transmittance of visible light depends on the ion storage level in the electrochromic layer, wherein the ions migrate from the counter electrode through the electrolyte to the electrochromic layer. The transmittance can be influenced through the voltage applied on the the first electrically conductive layer and the second electrically conductive layer, which causes this migration of ions. Suitable electrochromic layers include, for example, at least tungsten oxide or vanadium oxide. Electrochromic functional elements are known, for example, from WO 2012007334 A1, US 20120026573 A1, WO 2010147494 A1, and EP 1862849 A1.

In an alternative embodiment, the active layer contains no electrolyte, with the electrochromic layer itself functioning as an electrolyte. Thus, for example, tungsten oxide can assume, depending on its oxidation state, the function of an electrolyte. Such configurations are, for example, disclosed in US 2014/0022621 A1. Reference is made, in particular, to FIG. 4F of US 2014/0022621 A1.

Besides the active layer and the electrically conductive layers with electrically insulating barrier layers, the glazing can, of course, have other layers known per se, for example, antireflection or reflection layers, protective layers, and/or smoothing layers.

The layer stack of electrically conductive layers with barrier layers and the active layer can be applied either directly or indirectly, preferably indirectly, on the substrates.

In an alternative embodiment of the glazing according to the invention, the electrically conductive layers are directly connected to one side of the substrates via a polymeric film. The polymeric film preferably contains polyethylene terephthalate and/or polyurethane. In a preferred embodiment, the electrically conductive layers are arranged on a film made of polyethylene terephthalate and subsequently laminated with adhesive films. The multilayer composite is then arranged on one side of the pane and attached, for example, by the adhesive film. Adhesive films according to the invention contain, for example, polyurethane. This has the particular advantage that the sensitive electrically conductive layers are stabilized by the multilayer composite and protected against mechanical effects. The multilayer composite can be processed in a particularly simple and economical manner.

In another alternative embodiment of the invention, the electrically conductive layers are indirectly connected to one side of the substrates via a carrier glass. The carrier glass includes, for example, soda lime glass, quartz glass, or borosilicate glass and can differ from the substrate in its composition, but can also have an identical composition. In a preferred embodiment, the electrically conductive layers are deposited on the carrier glass and subsequently laminated with adhesive films. The multilayer composite is then arranged on one side of the substrate and attached, for example, by the adhesive film. Adhesive films according to the invention contain, for example, polyurethane. This has the particular advantage that the sensitive electrically conductive layers are stabilized by the multilayer composite and protected against mechanical effects. The multilayer composite can be processed in a particularly simple and economical manner.

The substrates preferably contain glass, particularly preferably flat glass, float glass, quartz glass, borosilicate glass, soda lime glass, or clear plastics, particularly preferably rigid clear plastics, for example, polycarbonate or polymethylmethacrylate. The substrates can be clear and transparent or even tinted or colored. The thickness of the substrates can vary widely and thus be adapted to the requirements in the individual case. The thickness of each substrate is preferably between 0.1 mm and 15 mm, particularly preferably between 0.5 mm and 5 mm. The glazing can have any three-dimensional shape. The glazing is preferably flat or slightly or greatly curved in one or a plurality of spatial directions.

The glazing according to the invention can include both one substrate as well as, moreover, a plurality of substrates. These can, for example, be implemented as a composite pane or even as an insulating glazing unit, whose panes are connected via a spacer. Such structures are sufficiently well known to the person skilled in the art. Generally speaking, the structure is selected such that the electrochromic functional element is implemented internally and is thus protected.

The invention further includes a method for producing a glazing, in particular according to the invention, with electrically switchable properties, wherein at least:
a) a first substrate is provided,
b) a first electrically conductive layer is applied,
c) an active layer is applied, and
d) a second electrically conductive layer is applied,
wherein in the steps b) and/or d) at least one electrically insulating barrier layer is applied within the first electrically conductive layer and/or the second electrically conductive layer.

Preferably, the deposition of the first electrically conductive layer and/or the second electrically conductive layer in the steps b) and/or d) is done alternatingly with the deposition of the electrically insulating barrier layer.

The electrically conductive layers and/or the barrier layers are applied by physical vapor deposition (PVD) or chemical vapor deposition (CVD), preferably cathodic sputtering, particularly preferably magnetically-enhanced cathodic sputtering (magnetron sputtering) on the substrate or the previously deposited layers. Suitable process parameters are well known to the person skilled in the art.

Alternatively, the electrically conductive layers and/or the barrier layers can also be printed onto the substrate in the form of nanoparticles and subsequently sintered in order to obtain a homogeneous layer.

The method for depositing the active layer varies depending on their design. Already within possible designs of the active layer, reference has been made to various publications that contain suitable methods for depositing such layers already known to the person skilled in the art.

In a preferred embodiment of the method, an electrochromic functional element is applied as an active layer, wherein first, an electrochromic layer, optionally, an electrolyte, and, thereafter, a counter electrode are deposited.

The invention is explained in the following with reference to drawings. The drawings are purely schematic representations and not true to scale. The drawings in no way restrict the invention.

They depict.

Figure 1:
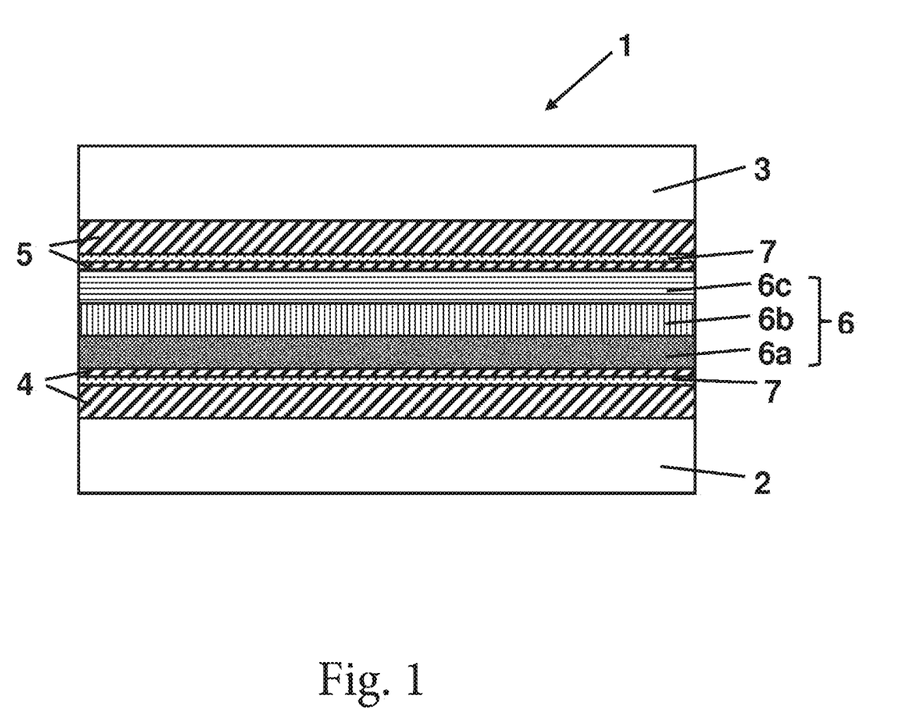
FIG. 1 a glazing according to the invention with an electrochromic functional element as an active layer and two electrically conductive layers as surface electrodes, wherein, in each case, one electrically insulating barrier layer is introduced into each electrically conductive layer, FIG. 2 a glazing according to the invention with an electrochromic functional element as an active layer and two electrically conductive layers as surface electrodes, wherein, in each case, two electrically insulating barrier layers are introduced into each electrically conductive layer, FIG. 3 a glazing according to the invention with an electrochromic functional element as an active layer and two electrically conductive layers as surface electrodes, wherein, in each case, three electrically insulating barrier layers are introduced into each electrically conductive layer, FIG. 4 another preferred embodiment of the glazing with an electrochromic functional element as an active layer and two electrically conductive layers as surface electrodes, wherein, in each case, two electrically insulating barrier layers are introduced into each electrically conductive layer.

FIG. 1 depicts a glazing 1 according to the invention with an electrochromic functional element as an active layer 6 and two electrically conductive layers 4, 5, wherein, in each case, an electrically insulating barrier layer 7 is introduced into each electrically conductive layer 4, 5. The barrier layers 7 produce, together with the respective electrically conductive layer 4, 5, the surface electrodes of the glazing. A first electrically conductive layer 4 made of indium tin oxide (ITO) with a total thickness of 400 nm is deposited on a first substrate 2 made of soda lime glass with a thickness of 2.1 mm. The first electrically conductive layer 4 contains an electrically insulating barrier layer 7 made of doped tantalum oxide with a thickness of 20 nm, wherein 90% of the first electrically conductive layer 4 is located below the barrier layer 7 in the immediate vicinity of the substrate, the barrier layer 7 follows thereupon, and the remaining portion (10% of the total thickness) of the first electrically conductive layer 4 follows on the barrier layer. Accordingly, a section of the first electrically conductive layer 4 with a thickness of 360 nm (90% of the total thickness) and a section of the first electrically conductive layer 4 with a thickness of 40 nm (10% of the total thickness) are situated on the first substrate 2. In direct contact with this thinner section of the first electrically conductive layer 4 is the active layer 6, which consists of an electrochromic layer 6a of cathodic electrochromic material made of tungsten oxide ($WO_3$) with a thickness of 350 nm, a two layer electrolyte 6b, made of a layer of hydrated tantalum oxide with a thickness of 100 nm and a layer of hydrated antimony oxide also with a thickness of 10 nm, as well as a counter electrode 6c comprising an anodic electrochromic material of hydrated iridium oxide $IrO_x$ with a thickness of approx. 50 nm. Immediately adjacent the counter electrode 6c, the second electrically conductive layer 5, made of indium tin oxide (ITO), follows the active layer 6. On this side of the active layer 6 as well, there is, according to the invention, direct contact with the electrically conductive layer, by which means good electrical contacting of the active layer 6 and thus error-free functionality of the electrically switchable glazing 1 is ensured. The part of the second electrically conductive layer 5 making direct contact with the counter electrode 6c has a thickness of 10% (40 nm) based on the total thickness of the second electrically conductive layer of 400 nm. Following this thinner section of the second electrically conductive layer, an electrically insulating barrier layer 7 made of doped tantalum oxide with a thickness of 20 nm is introduced into the electrically conductive layer, followed by the remaining layer portion of the second electrically conductive layer 5 with a thickness of 360 nm (90% of the total thickness). The layer stack ends with a second substrate 3 made of soda lime glass with a thickness of 2.1 mm, which is connected to the layer stack via a lamination film (not shown).

This structure according to the invention has proved particularly advantageous in practice. The electrically conductive layers 4, 5 with electrically insulating barrier layers 7 have anisotropic conductivity, wherein the horizontal conductivity (parallel to the layer) should be as high as possible in order to ensure good electrical contacting and the vertical conductivity (perpendicular to the layer) should only be so as high as is necessary for the unrestricted function of the active layer 6. Essential for such error-free functioning of the active layer 6 is direct electrical contacting between the first electrically conductive layer 4 and the electrochromic layer 6a or the second electrically conductive layer 5 and the counter electrode 6c as well as low contact resistance at these layer transitions. This is provided according to the invention. The electrically conductive layers 4, 5 are divided by the barrier layers 7 into a plurality of layer portions, whose sheet resistance is increased by this division according to the invention into layers of lower thickness. Since the sheet resistance of the individual layer is increased (compared to a total layer without barrier layers), in the event of a short circuit of this individual layer with a layer portion of opposite polarity, a smaller short circuit current occurs. The defect is thus far less visible and is visually less noticeable for the observer. Tests show that the number of glazings that cannot be marketed due to defects can be reduced with the solution according to the invention by 90% compared to prior art glazings.

Figure 2:
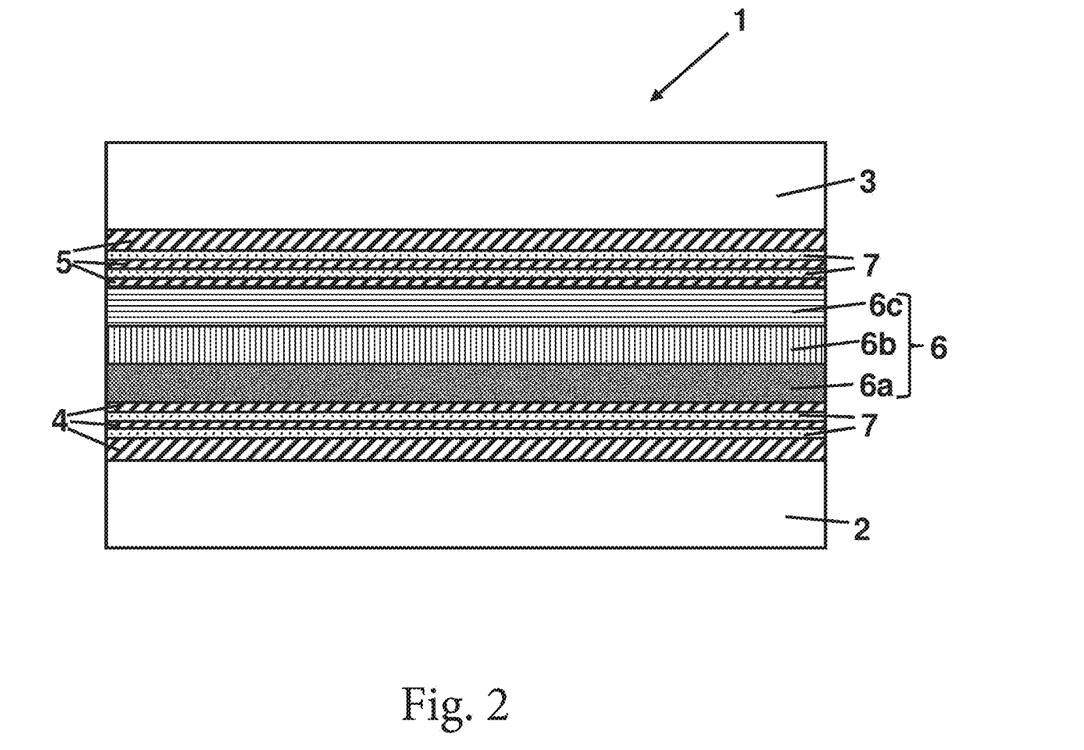

FIG. 2 depicts a glazing 1 according to the invention with an electrochromic functional element as an active layer 6 and two electrically conductive layers 4, 5, wherein, in each case, two electrically insulating barrier layers 7 are introduced into each electrically conductive layer 4, 5. The basic structure corresponds to that depicted in FIG. 1, wherein according to FIG. 2, in each case, two electrically insulating barrier layers 7 are introduced into each electrically conductive layer 4, 5. This yields a layer sequence consisting of a first substrate 2, a first electrically conductive layer 4 including two barrier layers 7, an active layer 6, a second electrically conductive layer 5 including two barrier layers 7, and a second substrate 3. Following the first substrate 2 is a section of the first electrically conductive layer 4 with a thickness of 200 nm (50% of the total thickness), an electrically insulating barrier layer 7 with a thickness of 20 nm, a section of the first electrically conductive layer 4 with a thickness of 120 nm (30% of the total thickness), another electrically insulating barrier layer 7 with a thickness of 20 nm, and a section of the first electrically conductive layer 4 with a thickness of 80 nm (20% of the total thickness). This is followed by the active layer 6, making direct contact with the last-mentioned portion of the first electrically conductive layer 4. The composition of the active layer 6 corresponds to that described in FIG. 1. The active layer 6 is followed by a section of the first electrically conductive layer 5 with a thickness of 80 nm (20% of the total thickness), an electrically insulating barrier layer 7 with a thickness of 20 nm, a section of the first electrically conductive layer 5 with a thickness of 120 nm (30% of the total thickness), another electrically insulating barrier layer 7 with a thickness of 20 nm, and a section of the first electrically conductive layer 5 with a thickness of 200 nm (50% of the total thickness), wherein the first-mentioned section of the electrically conductive layer (thickness 80 nm) makes direct electrical contact with the active layer 6. The layer stack ends with a second substrate 3, which is connected to the layer stack via a lamination film (not shown).

This embodiment according to the invention represents another improvement of the structure depicted in FIG. 1. Since two barrier layers 7 are present per electrically conductive layer 4, 5, the defect tolerance of the glazing is already increased in that a further barrier layer is present, if the layer positioned over it is part of the delaminated region. Moreover, with an increasing number of barrier layers used, the electrically conductive layers are divided into increasingly thinner individual layers. The sheet resistance of these layers is inversely proportional to the layer thickness, as a result of which the sheet resistance of the individual layers increases with an increasing number of barrier layers that are introduced into an electrically conductive layer. This increase in the sheet resistance is advantageous in terms of a reduction of the short circuit current in the event of a short circuit. The barrier layers can divide an electrically conductive layer into individual layers of the same layer thickness or even, as is the case in FIG. 2, into layers of different thickness. It has been demonstrated that an increase in the thickness of the electrically conductive individual layers starting from the active layer 6 in each case in the direction of the nearest substrate 2, 3 is particularly advantageous. The closer a layer fragment is to the active layer, the more likely this fragment will be affected by a local delamination. Thus, it is desirable to reduce the layer thickness of the electrically conductive individual layers in the direction of the active layer 6 and thus to increase the sheet resistance in the same direction.

Figure 3:
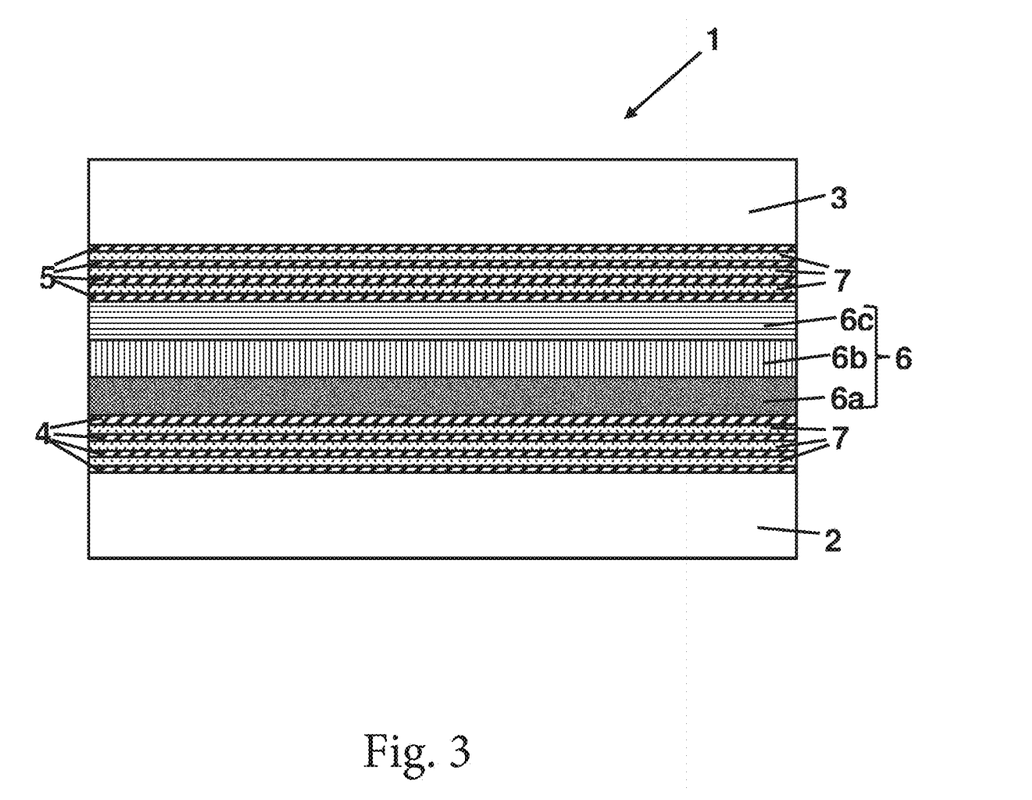

FIG. 3 depicts a glazing 1 according to the invention with an electrochromic functional element as an active layer 6 and two electrically conductive layers 4, 5, wherein, in each case, three electrically insulating barrier layers 7 are introduced into each electrically conductive layer 4, 5. The basic structure corresponds to that depicted in FIG. 1, wherein according to FIG. 3, in each case, three electrically insulating barrier layers 7 are introduced into each electrically conductive layer 4, 5. Following the first substrate 2 is a section of the first electrically conductive layer 4 with a thickness of 100 nm (25% of the total thickness), an electrically insulating barrier layer 7 with a thickness of 20 nm, a section of the first electrically conductive layer 4 with a thickness of 100 nm (25% of the total thickness), another electrically insulating barrier layer 7 with a thickness of 20 nm, a section of the first electrically conductive layer 4 with a thickness of 100 nm (25% of the total thickness), another electrically insulating barrier layer 7 with a thickness of 20 nm, and a section of the first electrically conductive layer 4 with a thickness of 100 nm (25% of the total thickness). This is followed by the active layer 6, making direct contact with the last-mentioned portion of the first electrically conductive layer 4. The composition of the active layer 6 corresponds to that described in FIG. 1. The active layer 6 is followed by the second electrically conductive layer 5 including three electrically insulating barrier layers 7, wherein the layer structure corresponds to the structure just described of the first electrically conductive layer 4, and the second electrically conductive layer 5 is divided by the barrier layers 7 into four individual layers of the same size. The section of the electrically conductive layer 5 nearest the active layer 6 makes direct contact with the active layer 6. The layer stack ends with a second substrate 3.

The tolerance of the glazing 1 according to the invention can be further improved by introducing additional barrier layers.

Figure 4:
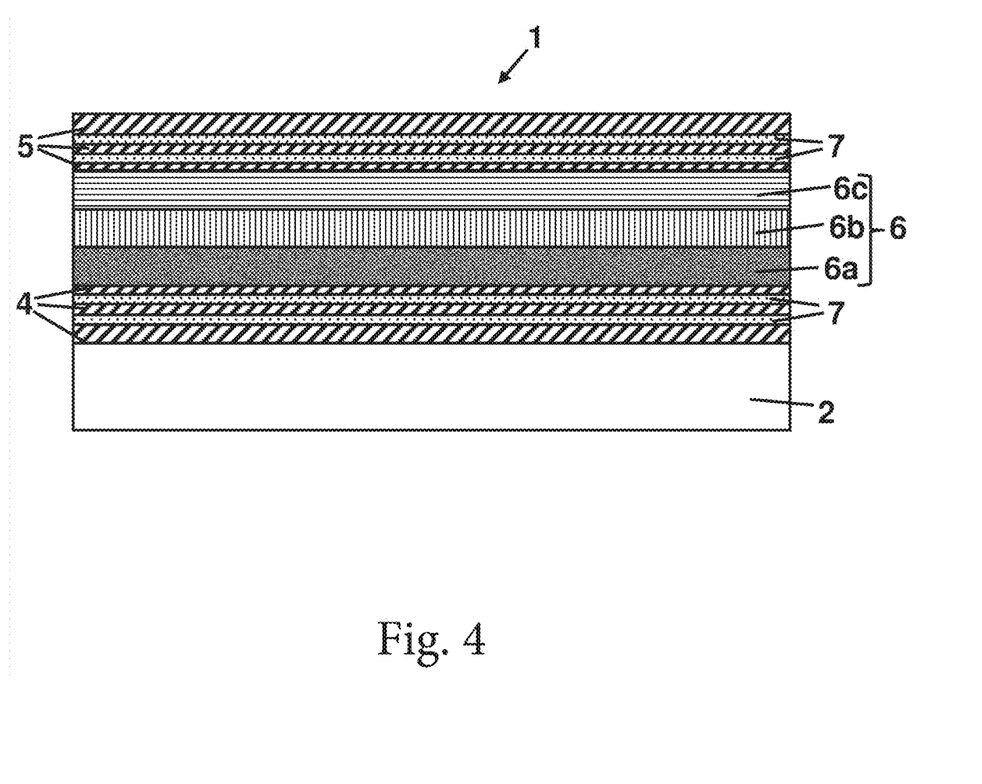

FIG. 4 depicts a glazing according to the invention with an electrochromic functional element as an active layer 6 and two electrically conductive layers 4, 5, wherein, in each case, two electrically insulating barrier layers 7 are introduced into each electrically conductive layer 4, 5. This yields a layer sequence consisting of a first substrate 2, a first electrically conductive layer 4 including two barrier layers 7, an active layer 6, and a second electrically conductive layer 5 including two barrier layers 7. The basic structure corresponds to that depicted in FIG. 2, wherein according to FIG. 4, no second substrate is present as the end of the layer stack, and the structure of the layers differs as described in the following. The glazing in FIG. 4 can, for example, be used in an insulating glazing, wherein the second electrically conductive layer points toward the glazing interior of the insulating glazing and is thus protected against environmental influences. Alternatively, a second substrate analogous to the arrangement depicted in FIG. 2 can be applied. According to FIG. 4, the first substrate 2 is followed by a section of the first electrically conductive layer 4 made of ZnO:Al with a thickness of 300 nm (approx. 61.2% of the total thickness) and a layer resistance of $R_\square = 10\Omega$, an electrically insulating barrier layer 7 made of $SiO_2$ with a thickness of 10 nm, a section of the first electrically conductive layer 4 made of ZnO:Al with a thickness of 150 nm (approx. 30.6% of the total thickness) and a layer resistance of $R_\square = 20\Omega$, another electrically insulating barrier layer 7 made of $SiO_2$ with a thickness of 10 nm, and a section of the first electrically conductive layer (4) made of ITO with a thickness of 40 nm (approx. 8.2% of the total thickness) and a layer resistance of von $R_\square = 40\Omega$. This is followed by the active layer 6, making direct contact with the last-mentioned portion of the first electrically conductive layer 4. The composition of the active layer 6 corresponds to that described in FIG. 1. The active layer 6 is followed by a section of the first electrically conductive layer 5 made of ITO with a thickness of 40 nm (approx. 8.2% of the total thickness) and a layer resistance of $R_\square = 40\Omega$, an electrically insulating barrier layer 7 made of $SiO_2$ with a thickness of 10 nm, a section of the first electrically conductive layer 5 made of ZnO:Al with a thickness of 150 nm (approx. 30.6% of the total thickness) and a layer resistance of $R_\square = 20\Omega$, another electrically insulating barrier layer 7 made of $SiO_2$ with a thickness of 10 nm, and a section of the first electrically conductive layer 5 made of ZnO:Al with a thickness of 300 nm (approx. 61.2% of the total thickness) and a layer resistance of $R_\square = 10\Omega$, wherein the first-mentioned section of the electrically conductive layer 5 with a thickness of 40 nm makes direct electrical contact with the active layer 6. The specific resistance of the barrier layers made of $SiO_2$ is $10^9$ $\Omega m$. The layer resistances of the individual layers yield, for each of the surface electrodes made up of an electrically conductive layer and associated barrier layers, a resistance of $R_\square = 5.7\Omega$.

This embodiment according to the invention represents a further improvement of the embodiment depicted in FIG. 2. In addition to the advantages explained there, additional advantages in accordance with FIG. 4 result from the selection of material of the various sections of the electrically conductive layers 4, 5. The sections of the electrically conductive layers 4, 5 adjacent the active layer 6 are made of indium tin oxide (ITO), which has very good compatibility with the materials of the active layer 6. Also, ITO is a base very well suited for deposition of the active layer 6 such that clean growth of the active layer 6 in the deposition process is ensured. The layer sections of the electrically conductive layers 4, 5 not in contact with the active layer 6 are made of aluminum-doped zinc oxide (ZnO:Al). This is significantly more economical than ITO and and still represents a good compromise in terms of characteristics such as transmittance and conductivity.

LIST OF REFERENCE CHARACTERS (1) glazing
(2) first substrate
(3) second substrate
(4) first electrically conductive layer
(5) second electrically conductive layer
(6) active layer
(6a) electrochromic layer
(6b) electrolyte
(6c) counter electrode
(7) electrically insulating barrier layer

The invention claimed is:

1. A glazing having electrically switchable properties, the glazing comprising, areally arranged in sequence:
   a first substrate;
   a first electrically conductive layer;
   an active layer; and
   a second electrically conductive layer,
      wherein each of the first electrically conductive layer and the second electrically conductive layer comprises at least one electrically insulating barrier layer that is areally arranged within the electrically conductive layer,
      wherein the at least one electrically insulating barrier layer arranged within the first electrically conductive layer is completely covered, areally, by the first electrically conductive layer and divides the first electrically conductive layer into at least two layer sections made of the same material, wherein the at least one electrically insulating barrier layer arranged within the second electrically conductive layer is completely covered, areally, by the second electrically conductive layer, and, divides the second electrically conductive layer into at least two layer sections made of the same material.

2. The glazing according to claim 1, wherein the at least one of the first electrically conductive layer and the second electrically conductive layer is directly adjacent the active layer.

3. The glazing according to claim 1, wherein the at least one electrically insulating barrier layer arranged within the first electrically conductive layer and the second electrically conductive layer, respectively, passes through the electrically conductive layer so that a layer portion of at least 1% of a total thickness of the electrically conductive layer is arranged between the electrically insulating barrier layer and the active layer.

4. The glazing according to claim 3, wherein the layer portion is least 5% of the total thickness of the electrically conductive layer.

5. The glazing according to claim 1, wherein at least one of the first electrically conductive layer and the second electrically conductive layer comprises 1 to 20 electrically insulating barrier layers.

6. The glazing according to claim 1, wherein at least one of the first electrically conductive layer and the second electrically conductive layer comprises 2 to 6 electrically insulating barrier layers.

7. The glazing according to claim 3, wherein within the layer portion is less than or equal to 50% of the total thickness of the electrically conductive layer.

8. The glazing according to claim 1, wherein at least one of the first electrically conductive layer and the second electrically conductive layer contain one or more of: a) silver,
b) gold, c) copper, d) nickel, e) chromium, f) tungsten, g) graphite, h) molybdenum, and i) a transparent conductive oxide.

9. The glazing according to claim 8, wherein i) comprises one of: i1) indium tin oxide (ITO), i2) fluorine-doped tin oxide ($SnO_2$:F), i3) antimony-doped tin oxide, i4) boron-doped zinc oxide, i5) aluminum-doped zinc oxide, and i6) gallium-doped zinc oxide.

10. The glazing according to claim 1, wherein at least one of the first electrically conductive layer and the second electrically conductive layer comprises a transparent conductive oxide layer having a layer thickness of 20 nm to 2 μm.

11. The glazing according to claim 10, wherein said layer thickness is 100 nm to 600 nm.

12. The glazing according to claim 1, wherein the at least two electrically insulating barrier layers comprise non-doped metal oxides or metal nitrides, and has a thickness of at most 100 nm.

13. The glazing according to claim 1, wherein the non-doped metal oxides or metal nitrides comprise one or more of: a) tantalum oxide, b) tin oxide, c) titanium oxide, d) silicon oxide, e) zirconium oxide, f) hafnium oxide, g) yttrium oxide, h) aluminum oxide, i) silicon nitride, and j) mixtures of one or more of a)-i).

14. The glazing according to claim 1, wherein the at least two electrically insulating barrier layers have a thickness of 5 nm to 30 nm.

15. The glazing according to claim 1, wherein the at least two electrically insulating barrier layers comprise doped metal oxides or metal nitrides, and have a thickness of at most 1000 nm.

16. The glazing according to claim 1, wherein the doped metal oxides or metal nitrides comprise one or more of: a) tantalum oxide, b) tin oxide, c) titanium oxide, d) silicon oxide, e) zirconium oxide, f) hafnium oxide, g) yttrium oxide, h) aluminum oxide, i) silicon nitride, and j) mixtures of one or more of a)-i).

17. The glazing according to claim 1, wherein the at least two electrically insulating barrier layers have a thickness of 100 nm to 300 nm.

18. The glazing according to claim 1, wherein the active layer is an electrochromic functional element.

19. The glazing according to claim 1, wherein the active layer is an electrochromic functional element, comprising:
an electrochromic layer adjacent the first electrically conductive layer; and
a counter electrode adjacent the electrochromic layer and adjacent the second electrically conductive layer.

20. The glazing according to claim 1, wherein the active layer is an electrochromic functional element, comprising:
an electrochromic layer adjacent the first electrically conductive layer; an electrolyte adjacent the electrochromic layer; and
a counter electrode adjacent the electrolyte and adjacent the second electrically conductive layer.

21. The glazing according to claim 1, wherein the first substrate and the second substrate comprise glass or polymers.

22. The glazing according to claim 21, wherein the glass comprises at least one of:
a) flat glass, b) float glass, c) quartz glass, d) borosilicate glass, and e) soda lime glass.

23. The glazing according to claim 1, wherein the polymers comprise at least one of: a) polycarbonate, and b) polymethylmethacrylate.

24. A method for producing a glazing having electrically switchable properties according to claim 1, the method comprising the steps of:
a) providing a first substrate;
b) applying a first electrically conductive layer on the first substrate;
c) applying an active layer on the first electrically conductive layer; and
d) applying a second electrically conductive layer on the active layer,
wherein in at least one step of the steps b) and d), at least one electrically insulating barrier layer is applied within a respective electrically conductive layer of the first electrically conductive layer and the second electrically conductive layer.

25. The method according to claim 24, wherein in the at least one step, applying of the respective electrically conductive layer is provided by depositing, alternatingly, the respective electrically conductive layer and the at least one electrically insulating barrier layer.

26. A method, comprising using of the glazing according to claim 1 as a glazing in buildings, or in means of transportation for travel on land, in the air, or in water.

27. The method according to claim 26, wherein using of the glazing in buildings comprises using in one or more of: a) an access area, b) a window area.

28. The method according to claim 26, wherein the means of transportation comprise one or more of: a) trains, b) watercraft, c) aircraft, and d) motor vehicles.

* * * * *